United States Patent [19]

Carr, Jr.

[11] 4,146,804
[45] Mar. 27, 1979

[54] SUPERCONDUCTIVE WINDING FOR AN IRON CORE ROTOR OF A DYNAMOELECTRIC MACHINE

[75] Inventor: Walter J. Carr, Jr., Pittsburgh, Pa.

[73] Assignee: Westinghouse Electric Corp., Pittsburgh, Pa.

[21] Appl. No.: 801,482

[22] Filed: May 31, 1977

Related U.S. Application Data

[63] Continuation of Ser. No. 538,290, Jan. 2, 1975, Pat. No. T975,003.

[51] Int. Cl.² ............................................. H02K 9/00
[52] U.S. Cl. .................................. 310/52; 310/68 R; 310/198
[58] Field of Search ............... 310/10, 72, 40, 261, 310/52, 264, 64, 265, 198–208, 68, 68 C; 318/514, 515, 254, 516, 138

[56] References Cited

U.S. PATENT DOCUMENTS

| | | | |
|---|---|---|---|
| 3,242,418 | 3/1966 | Mela | 310/10 |
| 3,470,396 | 9/1969 | Kafka | 310/10 |
| 3,679,920 | 7/1972 | MacNab | 310/52 |
| 3,743,867 | 7/1973 | Smith | 310/52 |
| 3,781,578 | 12/1973 | Smith | 310/52 |
| 3,956,648 | 5/1976 | Kirtley | 310/10 |
| 3,999,091 | 12/1976 | Kirtley | 310/52 |
| 4,063,122 | 12/1977 | Kullmann | 310/10 |

Primary Examiner—R. Skudy
Attorney, Agent, or Firm—J. W. Keen

[57] ABSTRACT

Iron or other ferromagnetic material is utilized in the rotor core of a dynamoelectric machine having a superconductive field winding. A parallel connection arrangement of the winding in combination with a plurality of current dividing resistance elements provides a sinusoidal distribution of current density across the circumference of the rotor. The magnetic field associated with the sinusoidal current distribution is reduced in critical interior regions of the winding by the demagnetizing field produced by the magnetic poles of the ferromagnetic core, thereby allowing a larger current to flow in the winding without destroying superconductivity. The two fields add in regions exterior to the winding, thereby providing a net increase in the useful external field obtained from a given amount of superconductive material.

14 Claims, 12 Drawing Figures

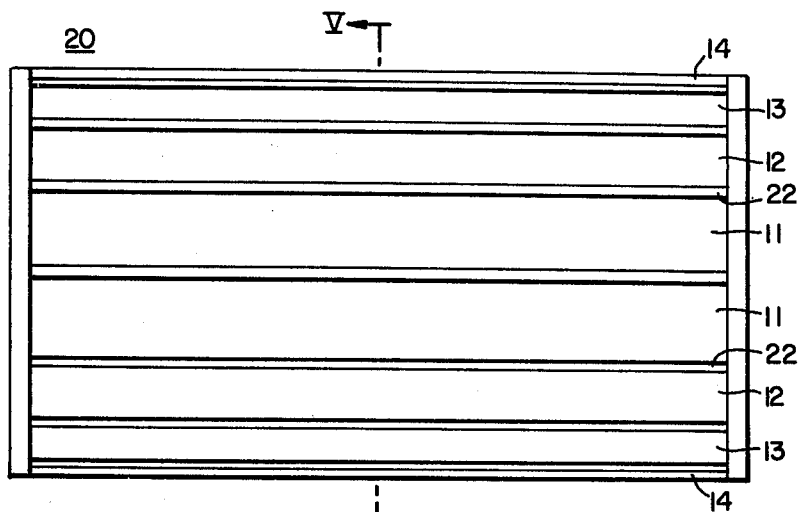
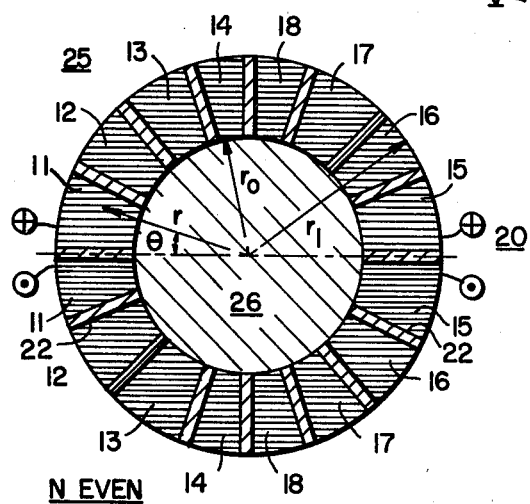
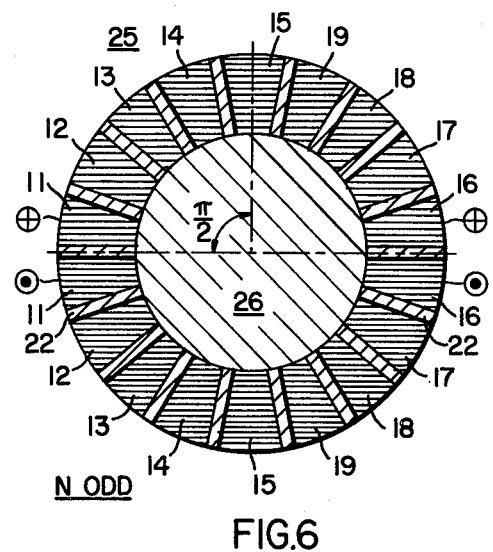
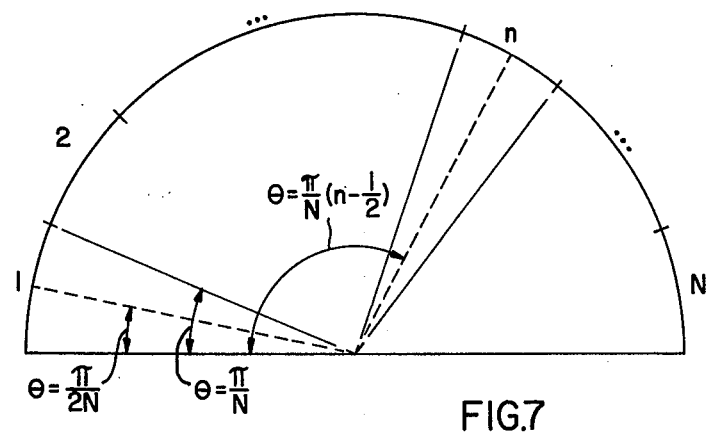

SUPERCONDUCTIVE WINDING FOR AN IRON CORE ROTOR OF A DYNAMOELECTRIC MACHINE

This is a continuation of application Ser. No. 538,290 filed Jan. 2, 1975, now a Defensive Publication No. T945,003.

BACKGROUND OF THE INVENTION

1. Field of the Invention

This invention relates generally to superconducting dynamoelectric machinery, and more specifically, to a dynamoelectric machine having a rotor comprising a superconductive field winding and a ferromagnetic core.

2. Description of the Prior Art

It is known that when certain materials, referred to as superconductors, are cooled to near absolute zero they exhibit a complete loss of electrical resistance. Practical utilization of the zero resistance character of superconductive materials at cryogenic temperatures has recently been applied in dynamoelectric machinery. The development of the intrinsically stable multifilamentary superconductor has made it possible to build stable superconducting windings with relatively high transport current densities in large direct current fields.

The use of the superconductive direct current field winding allows a considerable increase in the field magnetomotive force generated by the windings and greatly increased flux densities in the active air gap of the machine. This increase in flux density obtains considerably increased power density and consequential reductions in the weight and volume of the machine. The size and weight reductions make superconducting machines attractivve for such applications as electric drive ship propulsion systems. Also, higher ratings for turbine generators can be obtained without prohibitive increases in frame size.

It is useful to consider the phenomenon of superconductivity and the related properties of superconductors in order that the present invention may be clearly understood. Superconductivity is the state in which some metals offer no resistance to current and therefore do not generate heat as do normal conductors. The resistance at superconducting temperatures is not merely extremely low, it is exactly zero. Superconductivity occurs only at very low temperatures; the temperature is different for each material and is known as the transition or critical temperature, $T_c$. At the transition temperature, which is a few degrees above absolute zero, there occurs a thermodynamic transition into the superconducting state. The transition temperature, in the absence of a magnetic field, is approximately 3.7° Kelvin for tin, 7.3° Kelvin for lead, and 8° Kelvin for niobium. For further information on specific properties, see National Bureau of Standards Technical Note 724, "Properties of Selected Superconductive Materials," published by the U.S. Department of Commerce.

In addition to temperature, the strength and geometry of magnetic fields affect superconducting materials. A material will suddenly lose its superconductivity in a high strength magnetic field, even a self-generated field, when it reaches a value known as its critical magnetic field, $H_c$. There also exists a critical electrical current density, $J_c$, which is dependent upon both the temperature and the magnetic field. The three parameters T, H, and J define a three dimensional surface separating the superconducting and normal regions as illustrated in FIG. 1 of the drawings. For a given temperature (shaded region of FIG. 1) a superconducting coil will have some design load line as illustrated and an operating point P' chosen to be less than the critical point P, where a normal transition occurs. This return to the normal state is usually called a quench. It should be understood that while the shape of the critical curves for any superconductive material is generally as indicated in FIG. 1, the intercepts at the axes are determined by the properties of the material selected.

Superconductors which are suitable for high current density, high field applications (usually called type II or hard superconductors) are subject to instabilities, where a small disturbance in operating conditions can cause a quench, even though the critical current density, magnetic field, or temperature is not exceeded except in a very small region. The current carrying capability of a single superconductor is limited by the maximum field seen at any point on the conductor. The current rating of a superconductive winding will therefore be greatly reduced by high flux concentration, even in a small region of the winding.

A serious problem involved in superconducting windings is the maintenance of superconductivity under magnetic field conditions which tend to destroy superconductivity. An equally important consideration is that of obtaining the maximum useful external field available from a given amount of superconductive material, once operating stability is achieved.

Various techniques for preventing premature normalization due to non-uniform magnetic field conditions are known in the prior art. One known technique is to divide the superconductor into many fine filaments embedded in a high electrically and thermally conductive material such as high purity copper. The entire conductor is usually twisted about its axis to reduce eddy current losses. The copper dissipates heat from any small portion of the superconductor that may happen to normalize, thus preventing a stray normalization from heating the strand and triggering destruction of the superconductivity throughout the coil. Such a superconductor has been described by M. N. Wilson, et al, in "Experimental and Theoretical Studies of Filamentary Superconducting Composites, part I," "Journal of physics D-Applied physics," November 1970, Vol. 3, p. 1517.

The amount of the copper used in this technique is usually between one and three times the amount of superconductor. Although the use of copper increases operating stability, it has the undesirable effect of significantly reducing the overall current density, particularly when the ratio of copper to superconductor is increased to a proportion greater than 3:1. Thus there exists practical limitations on the use of the copper dissipation technique. Prior art superconducting machines which have utilized iron or other ferromagnetic material in the field structure have done so for reasons not associated with the control of the magnetic field intensity in critical winding regions. For example, U.S. Pat. No. 3,470,396 issued to W. Kafka shows an electric machine having an iron core rotor, the iron core being adapted to produce magnetic forces to compensate for centrifugal forces acting upon the rotor winding. Also, in the copending U.S. application Ser. No. 327,540 by C. J. Mole et al filed Jan. 29, 1973, now a Defensive Publication T917,006 and assigned to the assignee of the present invention, iron or other ferromagnetic material was used in the field structure of a dynamoelectric machine in order to obtain sufficient magnetic flux at those positions required during asynchronous modes of operation.

A superconductive field winding for the rotor of a dynamoelectric machine which utilizes the magnetic properties of a ferromagnetic core for control of the magnetic field in critical current density regions of the winding has not been disclosed by prior art devices. The known way to construct a superconductive field winding for a ferromagnetic core of the rotor of a dynamoelectric machine is to connect all portions of the winding in series with all conductors carrying the same current density. The magnetic field produced by the series connected winding arrangement is not uniform and the excitation current in the winding may be increased only until current flow in the point, or points at which the field is greatest reaches the critical value for the disruption of superconductivity. It is a principal object of the present invention, therefore, to provide a superconductive direct current field winding structure which is suitable for a rotor of a dynamoelectric machine which utilizes a ferromagnetic core such that the magnetic properties of the ferromagnetic core may be used to reduce the magnetic field which acts at certain critical points within the winding thereby allowing a larger current to flow in the winding without destroying superconductivity.

SUMMARY OF THE INVENTION

The present invention provides a superconductive winding structure which utilizes the magnetic properties of an iron core rotor to reduce the magnetic field intensity is selected critical regions within the winding. This result is obtained by a winding structure which includes a plurality of multi-turn superconductive coils which are angularly spaced about the periphery of the ferromagnetic core thereby defining two magnetic poles of opposite polarity. The coils comprising the magnetic pole pair are connected in parallel electrical relationship one to another so that they can be energized by a common direct current power source. A resistance element of a predetermined magnitude is connected in series with each of the parallel connected coils so that the current flow through the parallel connected coils at any given point will produce a current density which is generally proportional to the trigonometric sine of the angular displacement of the given point as measured from the geometric center of one magnetic pole toward the geometric center of the opposite magnetic pole.

In a superconductive winding having N coils per pole pair, each coil subtends $\theta = (\pi/N)$ radians in the upper half plane of the winding as illustrated in FIG. 7 of the drawing. The center of the first coil is located at $\theta = (\pi/2N)$ radians and each succeeding coil is displaced by a multiple of $\pi/N$ radians. The location of the center of the nth coil, where n is a member of the set $\{1, 2, 3, \ldots, N\}$, is $$\theta_n = (\pi/N)(n - \tfrac{1}{2}) \text{ radians,}$$

and the centers of the coils may be arranged in the following series:

$$\pi/2N, \pi/2N + \pi/N, \pi/2N + 2\pi/N, \ldots, \pi/N(n - \tfrac{1}{2}).$$

In such a winding arrangement the magnitude of the resistance elements associated with each coil which will provide a generally sinusoidal distribution of current density around the circumference of the ferromagnetic rotor core is given by the relation:

$$R_n = \frac{R_o}{\sin \frac{\pi}{N}(n - \tfrac{1}{2})},$$

where $n = 1, 2, \ldots, N$, and $R_0$ = a scalar constant, e.g., the desired value of the resistance element which is connected in series with the coil which is located at $\theta = \pi/2$.

The current density J around the circumference of the rotor will be approximately sinusoidally distributed according to the following relation:

$$J \approx J_o \sin \theta,$$

where $J_o$ is the value of the current density in the conductors at $\theta = \pi/2$.

Referring now to FIG. 5, for a long rotor, that is, one whose end effects may be neglected, the magnetic field produced by the sinusoidal current distribution as described above for a radius r between $r_1$ and $r_o$ is:

$$H_R = 2\pi J_o(s.f.)(r_1 - \frac{r_o^3}{3r^2} - \frac{2r}{3}) \cos \theta$$

$$H_\theta = -2\pi J_o(s.f.)(r_1 + \frac{r_o^3}{3r^2} - \frac{4}{3}r) \sin \theta$$

wherein $H_R$ and $H_\theta$ are, respectively, the components of field in the directions of increasing r and $\theta$, and s.f. is the space factor or filling factor of the conductors between the radii $r_o$ and $R_1$, which is a constant.

In addition, the ferromagnetic core will produce a "demagnetizing" field. If the field produced by the sinusoidal current distribution is large enough, the induced magnetization M of the core will be saturated at a value $M_s$, and the demagnetizing field in the region of the winding will be:

$$H_R = 2\pi M_s \frac{r_o^2}{r^2} \cos \theta;$$

$$H_\theta = 2\pi M_s \frac{r_o^2}{r^2} \sin \theta.$$

The total field in the winding is the sum of the field of the current and the demagnetizing field.

For a proper choice of dimensions, the maximum field in the winding as a function of radius occurs at the inside of the winding, $r = r_o$, and the magnitude of the field at $r = r_o$ is $$H = [[2 J_o(s.f.)(r_1 - r_o)]^2 + (2\pi M_s)^2 + 8\pi^2 J_o(s.f.)(r_1 - r_o)M_s \cos 2\theta]^{\tfrac{1}{2}}$$

At $\theta = \pi/2$ where the current density J is maximum, $$H = 2\pi J_o(s.f.)(r_1 - r_o) - 2 M_s,$$

i.e., it is reduced by $2\pi M_s$ due to the presence of the iron, which "shields" the winding at this point. This scheme is best suited for relative thick windings; i.e., $r_1 - r_o/r_o$ in the range of 0.5 to 1.0.

As the angle $\theta$ tends toward zero the field H in the winding increases since the shielding is less, but this can be tolerated without destroying the superconductivity because the current density in the conductors is less at these points. Thus a larger $J_o$ can be tolerated in the winding, and less superconducting material is needed to produce a given external field.

BRIEF DESCRIPTION OF THE DRAWINGS

The invention will be more fully understood from the following detailed description, taken in connection with the accompany drawing, in which:

FIG. 4 is a side elevational view of the rotor of the machine illustrated in FIG. 2;

FIG. 5 is a cross sectional view of the rotor of FIG. 4 taken along line IV—IV;

FIG. 6 is a view similar to FIG. 5 which illustrates a winding having an odd number of coils;

FIG. 7 is a conceptual illustration of the angular displacement of coils comprising a general winding;

DESCRIPTION OF THE PREFERRED EMBODIMENT

Figure 1:
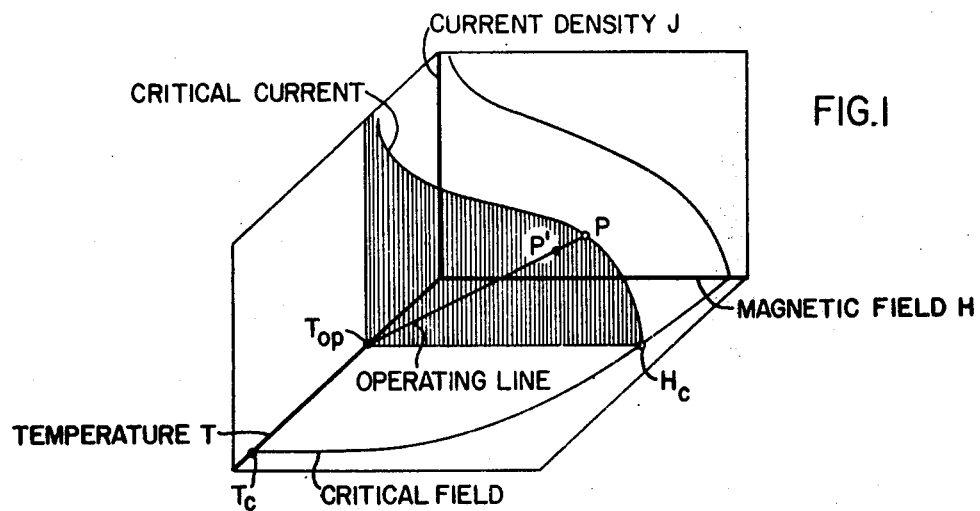
FIG. 1 is a graphical illustration of the relationship between temperature, magnetic field, and current density for a superconductor.

Throughout the description which follows, like reference characters refer to like elements on all Figures of the drawing.

Figure 2:
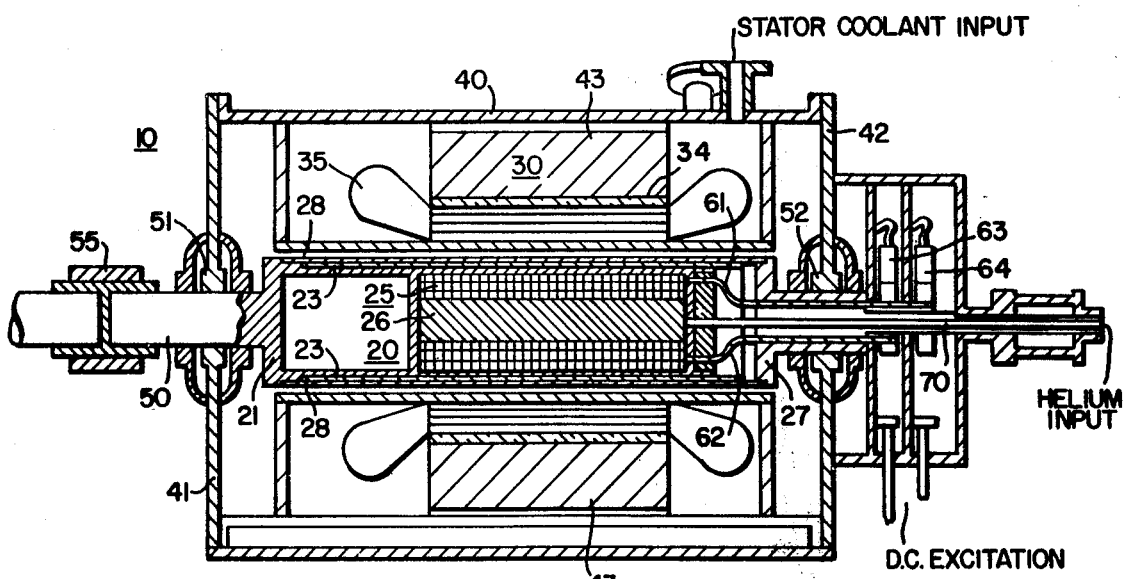
FIG. 2 is a cross sectional view of a dynamoelectric machine in which the present invention is incorporated.

Referring now to the drawing, FIG. 2 illustrates a synchronous generator 10 having a superconductive rotor field winding which is constructed according to the teachings of the present invention in a manner to be hereinafter described.

The generator 10 comprises a rotor assembly 20 and a stator assembly 30 which are enclosed in a housing 40. The housing 40 is generally cylindrical in shape and is closed by end plates 41 and 42. A shaft 50 is mounted in the housing by bearings 51 and 52. The bearings 51 and 52 are conventional and are positioned at each end of the housing 40 to support the shaft 50 for rotational movement by a prime mover (not shown). A flexible drive coupling 55 is used to isolate prime mover end play motion from the rotor assembly 20. The rotor assembly 20 comprises a superconductive direct current field winding 25 which is wound about a ferromagnetic core 26. The core 26 is preferably operated at cryogenic temperatures; however, it may be operated at normal temperatures. If it is operated at cryogenic temperatures, the magnetic core 26 may be made of a material that exhibits ferromagnetic characteristics at cryogenic temperatures, such as dysprosium, although other ferromagnetic materials may be used to good advantage. If the core 26 is operated at normal temperatures, a material such as iron may be used. Also shown is the stator 30 which supports a non-superconductive winding 35. The stator winding 35 is adapted for multi-phase alternating current output and the rotor field winding 25 is adapted for connection to a direct current source (not shown) for the excitation of the generator. The direct current electrical energy is applied to the winding 25 by means of appropriate slip ring assemblies 63, 64.

Figure 3:
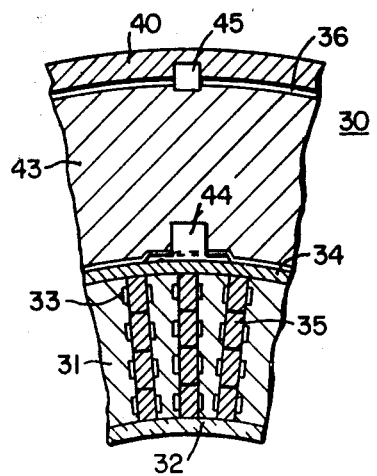
FIG. 3 is a cross sectional view of a portion of the stator of the machine of FIG. 1 taken along a plane transverse to its axis.

A typical cross section through the stator assembly 30 is shown in FIG. 3. Because of the high flux sweeping the armature, the stator windings are fabricated in an unconventional design from finely stranded litz wire. The stator windings 35 are disposed between non-conducting stator teeth 31 to minimize eddy current losses. The stator coils are wound on a cylindrical Micarta bore seal 32 and are bonded with fiberglass 34 on the outside surface to provide a strong nonconductive support. The stator assembly 30 is attached to an iron flux field 43 by means of a key 44. The iron flux shield 43 is fabricated from silicon iron stacked laminations and is attached by means of a key 45 to the stator frame 40. The flux shield 43 provides a symmetrical return path for magnetic flux generated by the rotor and stator windings 35.

Cooling of the stator assembly 30 is accomplished by passing oil on the outside of the conductor insulation through cooling ducts 33 located outside of the coil insulation. The oil flow is directed from one end turn area through the active length in the cooling ducts 33 which are machined in the teeth 31. The flow then passes from the other end turn area to a cooling annulus 36 between the iron shield 43 and the frame 40 for cooling the iron shield after the oil is discharged from the stator 30. An inner water cooling arrangement may be used instead of the oil arrangement for increased power operation.

The rotor design is shown conceptually in FIGS. 4, 5, 6, and 7. The rotor winding 25 is comprised of composite conductors made of a superconductive material such as niobium titanium (Nb-Ti) alloy. Each composite conductor consists of a plurality of fine filaments, each filament being approximately 40 microns or less in diameter. The filaments are embedded in a copper matrix and are twisted about the composite axis. The entire composite is covered with a thin layer of enamel insulation.

Referring now to FIGS. 2 and 4, the superconductive winding 25 is wound according to the teachings of the present invention about the cylindrical ferromagnetic core 26 and is wedged to minimize losses due to conductor motion. Cooling is provided by discrete ducts (not shown) disposed within the field winding 25. The cooling ducts direct the flow of a cryogenic fluid from one end turn area through the active length to the opposite end turn area where it is collected. A highly polished gold plated radiation shield 23, maintained at 36° to 90° Kelvin by exhaust cryogenic fluid, is provided to intercept radial and axial radiation from the warm rotor structure. The rotor structure and a dewar wall 27 provide a barrier for the permanently sealed vacuum environment surrounding the field winding 25.

The ferromagnetic core 26 preferably has neither slots nor teeth and is mechanically connected to the shaft 50 for rotation therewith. The core 26 may be integrally associated with the shaft 50 or it may be securely connected by suitable structure such as a spider arrangement. The ferromagnetic core 26 illustrated in the drawing comprises a relatively smooth surface around which the field winding 25 is wound. The winding 25 is disposed between nonmagnetic wedge members 22 in order to support the individual coils of the winding during rotational movement. The wedge members 22 are preferably made from stainless steel.

The field excitation leads 61, 62 are fabricated from stranded copper wire and connect the field winding 25 to the slip rings 63 and 64. Exhaust cryogenic fluid from the field winding is passed over the leads 61, 62 to reduce conduction heat loss to the fiel winding.

The cylindrical dewar vessel 27 surrounds the radiation shield 23 and the superconductive winding 25 and provides a thermally non-conductive casing. The interior of the dewar vessel 27 is maintained at a temperature near to absolute zero by an appropriate cryogenic fluid, such as helium. The cryogenic fluid is introduced into the interior of the dewar vessel 27 through a conduit 70 which extends through the housing end plate 42. The conduit 70 is insulated to minimize heat transfer through the wall.

An eddy current damper shield 28 made of electrically conductive material such as aluminum or copper, is located in the walls of the dewar vessel 27. The eddy current damper shield aids in preventing alternating current fields from penetrating into the superconductive field winding.

The superconductive field winding 25 shown in FIGS. 5 and 6 is a two-pole winding and consists of eight multi-turn coils 11, 12, 13, 14, 15, 16, 17 and 18. A number of coils other than eight may be used if desired. All of the conductors in the upper half-plane of FIG. 5 carry current along the axis perpendicular to the cross-section, and those in the lower half-plane are the return paths, carrying current in the opposite direction. Each of the coils consists of multiple turns of a superconductor axially disposed between the wedge members 22 about the cylindrical ferromagnetic core 26. In order to maintain dynamic mechanical balance in the winding structure and uniform magnetic flux distribution, the coils are preferably symmetrically arranged about the rotor core 26.

In accordance with the invention, the coils are connected in parallel electrical relation one to another so that they can be energized by a common direct current power source (not shown). A resistance element is connected in series with each of the parallel connected coils. The relative magnitude of each resistance element is determined by the division of current required for a sinusoidal distribution. Since the direct current resistance of the parallel connected superconducting windings is zero, the current dividing resistance elements can have very small resistances on the order of $10^{-7}$ to $10^{-8}$ ohms and thus will have very low power dissipation. The resistance elements are preferably disposed within the dewar 27 in the low temperature environment surrounding the winding 25. The resistance elements should be symmetrically arranged about the end portion of the rotor in order to insure dynamic mechanical balance. Exhaust cryogenic fluid is used to cool the resistance elements in the same manner as leads 61 and 62 are cooled in order to reduce the conduction heat loss to the field winding 25.

Figure 8:
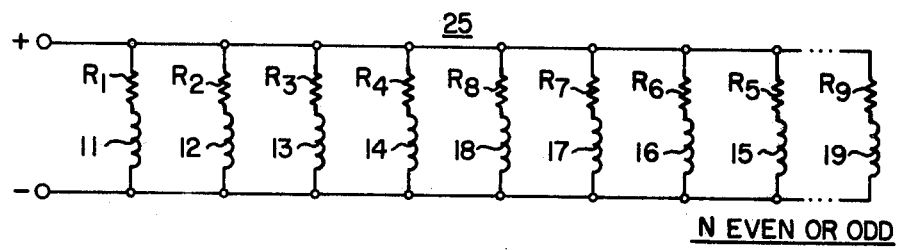
FIG. 8 is a schematic connection diagram of a typical winding embodying the invention.
Figure 9:
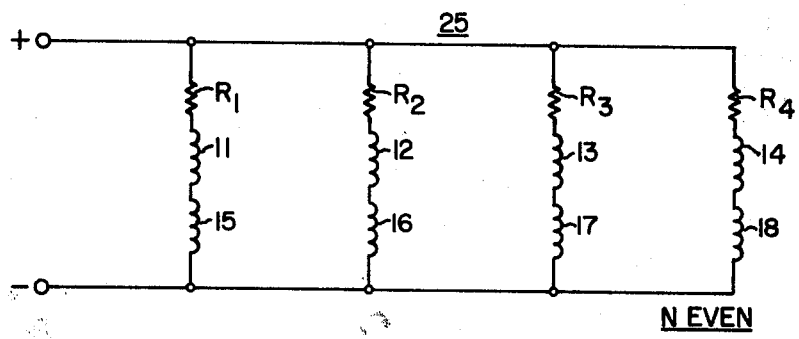
FIG. 9 is a schematic diagram of an alternate connection arrangement for the winding of FIG. 8.
Figure 10:
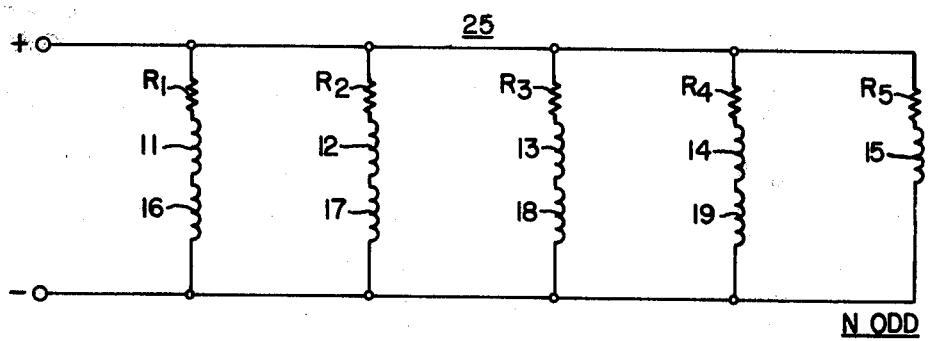
FIG. 10 is a schematic diagram of an alternate connection arrangement for the winding of FIG. 6.

A schematic diagram for a winding arrangement including the eight parallel connected coils is shown in FIGS. 8, 9, and 10. In FIG. 8, each parallel connected coil has a resistance element of predetermined magnitude connected in series in order to obtain an approximate sinusoidal current density distribution across the surface of the rotor 20. The magnitude of the resistance elements may be determined from the equation given earlier, namely $$R_n = \frac{R_o}{\sin \frac{\pi}{N}(n - \frac{1}{2})} ; n = 1, 2, \ldots, N.$$

$R_o$ is a scaler constant, e.g., the value of the resistance element to be placed in series with the parallel connected coil which is angularly disposed approximately $\pi/2$ or 90° from the geometrical center of its associated magnetic pole. Representative values for the resistance elements are given Table I below:

TABLE I:

| n | N = 8 (Even) $\theta_n$ | $R_n$ |
|---|---|---|
| 1 | $\frac{\pi}{16}$ | 5.13 $R_o$ |
| 2 | $\frac{3\pi}{16}$ | 1.79 $R_o$ |
| 3 | $\frac{5\pi}{16}$ | 1.20 $R_o$ |
| 4 | $\frac{7\pi}{16}$ | 1.02 $R_o$ |
| 5 | $\frac{9\pi}{16}$ | 1.02 $R_o$ |
| 6 | $\frac{11\pi}{16}$ | 1.20 $R_o$ |
| 7 | $\frac{13\pi}{16}$ | 1.79 $R_o$ |
| 8 | $\frac{15\pi}{16}$ | 5.13 $R_o$ |

It should be noted that where the coils are symmetrically distributed about the point $\theta = \pi/2$, as illustrated in FIG. 5, the coils 11 and 15 are disposed within regions of equal magnetic field intensity, and the coils (12, 16), (13, 17), and (14, 18) are similarly disposed. Since the coils of each pair carry the same current, they may be connected in series one to another, and the series connected pairs are connected in parallel. A single resistance element per pair is sufficient for this alternate connection arrangement as illustrated in FIG. 9. A total of four resistance elements $R_1$, $R_2$, $R_3$, and $R_4$ are required for this connection arrangement and their magnitudes are the same as given in Table I above.

In the case where the number of coils, N, is an odd integer, a single coil is centered at exactly $\pi/2$ radians and the remaining coils are disposed symmetrically on either side of the centrally located coil as shown in FIG. 6 of the drawing. The winding 25 of FIG. 6 comprises nine coils 11, 12, 13, 14, 15, 16, 17, 18, and 19 which may be connected as shown in FIG. 8 or FIG. 10. The coil 15 is centered exactly at $\theta = \pi/2$ radians and the coil pairs (11, 16), (12, 17), (13, 18), and (14, 19) are disposed symmetrically on either side of the coil 15.

In FIG. 8 of the drawing, an odd number of coils are shown connected in parallel electrical relationship one to another in an arrangement which utilizes nine resistance elements, $R_1$ through $R_9$ . . . (dotted portion). In FIG. 10 the symmetrically disposed coils are connected in series connected pairs, and the pairs are connected in parallel electrical relationship one to another and to the centrally disposed coil 15. In this arrangement only five resistance elements are utilized, $R_1$, $R_2$, $R_3$, and $R_4$ being connected in series with the coil pairs (11, 16), (12, 17), (13, 18), and (14, 19), respectively, and $R_5$ being connected in series with the centrally disposed coil 15.

Representative value for the resistance elements are given in Table II below:

TABLE II:

| | N = 9 (odd) | |
|---|---|---|
| n | $\theta_n$ | $R_n$ |
| 1 | $\frac{\pi}{18}$ | 5.77 $R_o$ |
| 2 | $\frac{3\pi}{18}$ | 2.00 $R_o$ |
| 3 | $\frac{5\pi}{18}$ | 1.30 $R_o$ |
| 4 | $\frac{7\pi}{18}$ | 1.06 $R_o$ |
| 5 | $\frac{\pi}{2}$ | $R_o$ |
| 6 | $\frac{11\pi}{18}$ | 1.06 $R_o$ |
| 7 | $\frac{13\pi}{18}$ | 1.30 $R_o$ |
| 8 | $\frac{15\pi}{18}$ | 2.00 $R_o$ |
| 9 | $\frac{17\pi}{18}$ | 5.77 $R_o$ |

Figure 11:
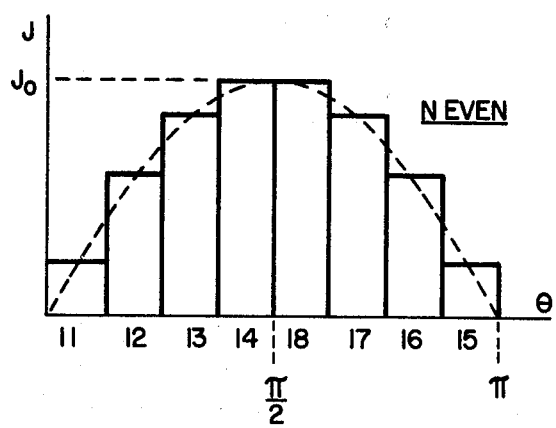
FIG. 11 is a graphical representation of the current density produced by a winding having an even number of coils.
Figure 12:
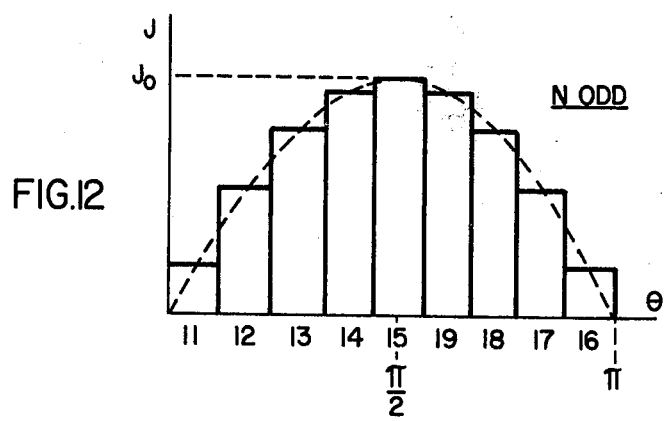
FIG. 12 is a graphical representation of the current density produced by a winding having an odd number of coils.

Operation of the winding 25 according to the teachings of this invention is depicted in FIGS. 11 and 12 which illustrate a sinusoidal variation of angular current density. The angular current density, instead of being uniform as in a conventional winding arrangement, varies approximately sinusoidally with the angle $\theta$ around the rotor circumference, and it is given by the relation:

$$J \approx J_o \sin \theta$$

wherein $J_o$ is the amplitude of the sinusoid occurring at $\theta = \pi/2$. The current density curves shown in FIGS. 11 and 12 are approximations of a sine function for a finite number of parallel connected coils. The approximation becomes more exact as the number of coils is increased.

It should be understood that the sine waves depicted in FIGS. 11 and 12 are sine waves in space, in contrast to sine waves in time. The space referred to in the present invention is of course the region within the winding itself.

It will now be apparent that an improved winding arrangement has been provided for a superconductive direct current field winding of a dynamoelectric machine which utilizes a ferromagnetic rotor core. By creating a sinusoidal current density distribution throughout the winding space and across the surface of the rotor, the magnetic field induced into the ferromagnetic core operates to shield the winding within those winding regions where current density and magnetic field are greatest. By using such a winding arrangement a net increase in the useful external magnetic field is obtained for a given amount of superconductive material since a larger source current can be tolerated in the winding. While particular embodiments of the invention has been shown and described for the purpose of illustration, it is evident that other arrangements and embodiments will be apparent to those skilled in the art. It is not desired, therefore, that the invention be limited to the specific arrangements shown and described.

What is claimed is:

1. A rotor of a dynamoelectric machine, said rotor comprising:
   a generally cylindrical ferromagnetic core;
   a winding comprising N superconductive multi-turn coils, N being a positive integer, said coils being electrically connected one to another and being disposed about said core thereby defining two magnetic poles of opposite polarity, said coils being distributed at intervals of $\pi/N$ radians about the periphery of said core as measured from the center of one magnetic pole to the center of said other magnetic pole; and
   means for adjusting the current flow through said coils such that the current density at any given point in said coils is generally proportional to the trigonometric sine of the angular displacement of said given point as measured from the center of one magnetic pole toward the center of said opposite polarity magnetic pole, said current flow adjusting means comprising a resistance element connected in series electrical relationship with each coil.

2. The rotor of claim 1 wherein N is a positive odd integer and one of said coils is centrally disposed at $\pi/2$ radians with respect to the center of a selected one of said magnetic poles, the remaining ones of said coils being symmetrically disposed in corresponding pairs with respect to said centrally disposed coil, said resistance element associated with each coil having a resistance of $R_n$ ohms, $R_n$ and N being in the relation:

$$R_n = \frac{R_o}{\sin \frac{\pi}{N}(n - \frac{1}{2})},$$

$R_o$ being the value of the resistance element which is connected in series with said centrally disposed coil, and n is a positive integer from the set [1, 2, ..., N] said set corresponding in a one-to-one relationship with said coils which are disposed at $\pi/N$ radian interval about the periphery of said core, said series connected coil and resistance element combinations being electrically connected in parallel electrical relationship one to another.

3. The rotor of claim 2 wherein the coils comprising each of said symmetrically disposed, corresponding coil pairs are connected in series electrical relationship one to another, said series connected coil pairs being connected in series electrical relationship with said resistance elements, said series connected coil pair and resistance element combinations being connected in parallel one to another and to said centrally disposed series connected coil and resistance element combination, n being a positive integer from the set [1, 2, ..., (N−1/2), (N−1/2) + 1].

4. The rotor of claim 1 wherein N is a positive even integer and said coils are symmetrically disposed in corresponding pairs about a point which is ($\pi/2$) radians from the center of a selected one of said magnetic poles, each of said coils being connected in series electrical relationship with a resistance of $R_n$ ohms, $R_n$ and N being in the relation:

$$R_n = \frac{R_o}{\sin \frac{\pi}{N}(n - \frac{1}{2})},$$

$R_n$ being a scaler constant of predetermined magnitude, and n being a positive integer from the set [1, 2, ..., N], said set corresponding in a one-to-one relationship with said coils.

5. The rotor of claim 4 wherein said corresponding coil pairs are connected in series electrical relationship one to another, said series connected coil pairs being connected in series electrical relationship with said resistance elements, said series connected coil pair and resistance element combinations being connected in parallel one to another, n being a positive integer from the set [1, 2, . . ., N/2].

6. The rotor of claim 1, said winding being adapted for electrical connection to a direct current source of electrical energy.

7. The rotor of claim 1 wherein the surface of said ferromagnetic core is substantially free of depressions.

8. The rotor of claim 1 wherein said ferromagnetic core is a cylinder having an outer radius $r_o$ and said winding is angularly spaced about said ferromagnetic core thereby forming a concentric cylinder having an outer radius of $r_1$, the ratio $(r_1 - r_o/r_1)$ ranging from 0.5 to 1.0.

9. The rotor of claim 1 wherein said winding is adapted for thermal contact with refrigeration means, said refrigeration means being adapted to induce and maintain a state of superconductivity in said winding under predetermined magnetic field and current density conditions.

10. The rotor of claim 1 wherein said resistance elements are adapted for thermal contact with refrigeration means, said resistance elements having a predetermined resistance at the operating temperature of said superconductive winding.

11. The rotor of claim 1 wherein said coils are supported upon said core by a plurality of wedge members, said wedge members being affixed to said core and extending radially therefrom.

12. The rotor of claim 1 in combination with a dynamoelectric machine having an annular stator core and a normally conducting stator winding disposed upon said stator core, said rotor being journalled for rotation within said stator.

13. The rotor of claim 1, said ferromagnetic core being composed of iron and operated at normally conducting temperatures.

14. The rotor of claim 1, said ferromagnetic core being composed of dysprosium and operated at cryogenic temperatures.

* * * * *